United States Patent
Uesugi et al.

(10) Patent No.: US 6,726,215 B2
(45) Date of Patent: Apr. 27, 2004

(54) DYNAMIC PRESSURE SEAL DEVICE AND ROTARY JOINT DEVICE USING THE SAME

(75) Inventors: Masakazu Uesugi, Yamanashi-ken (JP); Masahiro Tsunofuri, Yamanashi-ken (JP); Jun Nagano, Yamanashi-ken (JP); Shotaro Mizobuchi, Yamanashi-ken (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 10/212,084

(22) Filed: Aug. 6, 2002

(65) Prior Publication Data

US 2003/0030225 A1 Feb. 13, 2003

(30) Foreign Application Priority Data

Aug. 8, 2001 (JP) ......................................... 2001/240671

(51) Int. Cl.[7] ................................................. F16J 15/40
(52) U.S. Cl. ...................... 277/431; 277/411; 277/408; 415/80; 415/111
(58) Field of Search ................................ 415/80, 81, 111, 415/112; 277/408, 409, 411, 431

(56) References Cited

U.S. PATENT DOCUMENTS

| | | | | |
|---|---|---|---|---|
| 3,471,125 A | * | 10/1969 | Taubald et al. | ............. 415/112 |
| 3,504,987 A | * | 4/1970 | Dee | ............................... 415/91 |
| 3,969,822 A | * | 7/1976 | Fukuyama | ................... 433/132 |
| 5,203,575 A | * | 4/1993 | Azibert et al. | .............. 277/348 |
| 6,368,052 B2 | * | 4/2002 | Uesugi et al. | ................. 415/80 |
| 2001/0014281 A1 | | 8/2001 | Uesugi et al. | .............. 415/111 |

* cited by examiner

*Primary Examiner*—Anthony Knight
*Assistant Examiner*—Enoch E Peavy
(74) *Attorney, Agent, or Firm*—Rader, Fishman & Grauer PLLC

(57) ABSTRACT

Disclosed are a dynamic pressure seal device and a rotary joint device using the same which are applicable to a rotary body to be rotated at high speed and which are capable of effecting delivery of a target fluid between a rotary side member and a stationary side member without involving any leakage for a long period of time even when used for delivery of a high pressure fluid. The dynamic pressure seal device includes: a stationary side member mounted to a stationary portion and a rotary side member mounted to a rotary body, wherein the stationary side member and the rotary side member are opposed to each other through the intermediation of a predetermined bearing gap, a lubricant fluid being introduced into the gap to form a dynamic pressure bearing, the gap between the stationary portion and the rotary body being hermetically sealed by this dynamic pressure bearing.

3 Claims, 5 Drawing Sheets

DYNAMIC PRESSURE SEAL DEVICE AND ROTARY JOINT DEVICE USING THE SAME

BACKGROUND OF THE INVENTION

1. Field of the Invention

The present invention relates to a seal device for sealing a gap between a stationary portion and a rotating body, and to a rotary joint connecting piping formed on a stationary side member and piping formed on a rotation side member to each other to effect delivery of fluid between the stationary side member and the rotation side member. For example, the present invention relates to a dynamic pressure seal device for sending a high pressure coolant liquid or the like into the spindle main shaft of a machine tool rotating at high speed and to a rotary joint device using the same.

2. Description of the Related Art

Nowadays, regarding a spindle device for use in a machine tool, such as a grinding machine, there is a demand for a device which is small and which exhibits a high main shaft RPM from the viewpoint of performing high precision machining and high efficiency machining on a workpiece. However, when the main shaft RPM is high, great machining heat is generated at the machining point where the tool and work are in contact with each other, and this machining heat causes the sharpness of the tool to be lost and hinder the high precision machining. Thus, it is necessary to reliably supply coolant liquid to this machining point to restrain heat generation in the work and tool as a result of machining. However, when coolant liquid is supplied from outside to the tool rotating at high speed, the coolant liquid will be scattered by the centrifugal force, making it difficult for the coolant liquid to reach the machining point. Even if the supply amount of coolant liquid is increased, the cooling of the tool and work is not promoted.

To solve those problems, nowadays, a coolant liquid supply passage is formed inside the spindle main shaft holding the tool, and high pressure coolant liquid is caused to reach the machining point from the interior of the tool. This system is superior in cooling the machining point and is capable of meeting the demand for high precision machining. However, to supply high pressure coolant liquid to the interior of a spindle main shaft rotating at high speed, a high performance rotary joint device is indispensable which is capable of effecting delivery of coolant liquid between the spindle main shaft and the stationary housing supporting its rotation without involving any leakage.

A conventionally known rotary joint device of this type comprises a stationary side member provided on the stationary housing side, a rotary side member which is rotatably supported with respect to the stationary side member through the intermediation of a bearing and which is provided at an axial end of a rotating member such as a spindle main shaft, and a mechanical seal hermetically sealing the gap between the stationary side member and the rotary side member, wherein a recipient hole is formed in the rotary side member along the rotation axis and wherein a supply hole is formed in the stationary side member so as to be opposed to the recipient hole, fluid being blown into the recipient hole from the supply hole.

In this conventional rotary joint device, leakage of fluid from between the stationary side member and the rotary side member is prevented by a contact type mechanical seal, so that in a condition in which the rotary side member rotates at high speed, an intense abrasion is involved, resulting in a rather poor durability. Further, when used for delivery of high pressure fluid, the slide contact portion of the mechanical seal is required to be brought into slide contact with an accordingly high pressure, so that the service peripheral speed must be low, and it is impossible to connect the rotary side member to a spindle main shaft or the like rotating at high speed.

SUMMARY OF THE INVENTION

The present invention has been made in view of the above-mentioned problems inherent in the prior art. It is accordingly an object of the present invention to provide a dynamic pressure seal device which can be applied to a rotating body to be rotated at high speed and which is capable of effecting delivery of fluid between the rotary side member and the stationary side member without involving any leakage for a long period of time even when used for delivery of high pressure fluid, and a rotary joint device using the same.

Therefore, a dynamic pressure seal device according to the present invention relates to a seal device for hermetically sealing a gap between a stationary portion and a rotary body, the seal device being characterized by comprising a stationary side member mounted to the stationary portion and a rotary side member mounted to the rotary body, in which the stationary side member and the rotary side member are opposed to each other through the intermediation of a predetermined bearing gap, a lubricant fluid being introduced into the gap to form a dynamic pressure bearing, the gap between the stationary portion and the rotary body being hermetically sealed by the dynamic pressure bearing.

Further, a rotary joint device according to the present invention is a rotary joint device, which connects to each other piping formed in a stationary side member and piping formed in a rotary side member and which performs delivery of a target fluid between the stationary side member and the rotary side member, the joint device being characterized in that: the stationary side member and rotary side member are opposed to each other through the intermediation of a predetermined gap, into which a lubricant liquid is introduced to form a dynamic pressure bearing; the stationary side member has a supply hole opening on the bearing gap of the dynamic pressure bearing and adapted to supply the target fluid to the rotary side member; and the rotary side member has a recipient hole opening on the bearing gap of the dynamic pressure bearing so as to be opposed to the supply hole and adapted to receive the target fluid from the supply hole.

In the rotary joint device of the present invention, constructed as described above, the stationary side member and the rotary side member are opposed to each other through the intermediation of a predetermined gap to form a dynamic pressure bearing, and delivery of target fluid from the stationary side member to the rotary side member is effected through the bearing gap of the dynamic pressure bearing. That is, a supply hole opening on the bearing gap is formed in the stationary side member forming the dynamic pressure bearing, whereas, in the rotary side member, there is formed a recipient hole opening on the bearing gap of the dynamic pressure bearing and opposed to the supply hole, delivery of the target fluid being effected between the supply hole and the recipient hole.

The bearing gap between the stationary side member and the rotary side member constituting the dynamic pressure bearing is as small as several $\mu$m. Further, during the rotation of the rotary side member, a high pressure fluid lubricant film is formed in the bearing gap, so that it is possible to prevent, as much as possible, the drive fluid emitted from the supply hole from leaking into the gap between the stationary side member and the rotary side member, that is, into the bearing gap of the dynamic pressure bearing, enabling the total amount of target fluid emitted from the supply hole to flow into the recipient hole of the rotary side member. In other words, the dynamic pressure bearing functions as a seal for preventing leakage of the target fluid. Thus, in the rotary joint device of the present invention, the interval between the stationary side member and the rotary side member is hermetically sealed by a non-contact type seal, so that even under a condition of use in which the rotary side member rotates at high speed, the sealing function is not impaired due to abrasion, making it possible to effect delivery of the target fluid without involving any leakage for a long period of time.

Further, the pressure of the fluid lubricant film formed in the bearing gap of the dynamic pressure bearing is augmented as the RPM of the rotary side member increases, so that the higher the RPM of the rotary side member, the more enhanced the sealing function between the stationary side member and the rotary side member, making it possible to deliver high pressure fluid from the stationary side member to the rotary side member without leakage.

As described above, in the dynamic seal device of the present invention and the rotary joint device using the same, the target fluid is delivered from the stationary side member to the rotary side member through the bearing gap of the dynamic pressure bearing formed by the stationary side member and the rotary side member, and this dynamic pressure bearing functions as a non-contact type seal for preventing leakage of the target fluid, so that even under a condition of use in which the rotary side member rotates at high speed, the sealing function is not impaired by abrasion, and it is applicable to a rotary member to be rotated at high speed. Further, even when used for delivery of high pressure fluid, it is possible to effect delivery of the target fluid between the rotary side member and the stationary side member without involving any leakage for a long period of time.

DETAILED DESCRIPTION OF THE PREFERRED EMBODIMENT

A dynamic pressure seal device and a rotary joint device according to the present invention will now be described in detail with reference to the accompanying drawings.

Figure 1:
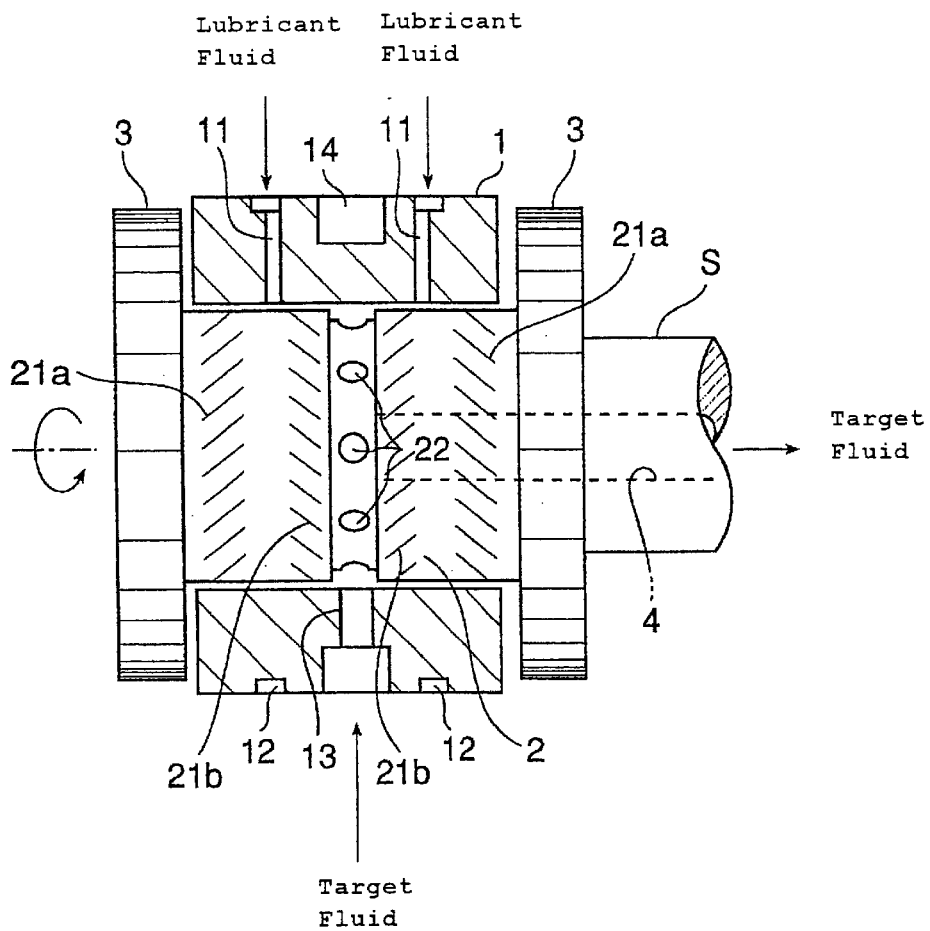
FIG. 1 is a sectional view of a rotary joint according to an embodiment of the present invention.

FIG. 1 schematically shows a rotary joint device including a dynamic seal device according to an embodiment of the present invention. This rotary joint device is used for the purpose of effecting delivery of a target fluid such as water or coolant fluid between a stationary housing (not shown) and a rotation shaft S, and comprises a stationary sleeve 1 serving as a stationary side member attached to the stationary housing, a rotary sleeve 2 which is attached to the rotation shaft S and fitted into a hollow portion of the stationary sleeve 1 with play and which serves as a rotary side member, and a pair of thrust discs 3 attached to the rotation shaft S such that the rotary sleeve 2 extends axially therebetween.

The inner peripheral surface of the stationary sleeve 1 and the outer peripheral surface of the rotary sleeve 2 are opposed to each other through the intermediation of a predetermined bearing gap, and these sleeves 1 and 2 cooperate so as to form a radial dynamic pressure bearing. In the outer peripheral surface of the rotary sleeve 2, there are formed four rows of dynamic pressure generating grooves 21a and 21b inclined in a predetermined direction with respect to the rotation shaft; when the rotary sleeve 2 rotates with the rotation shaft S, a high pressure fluid lubricant film is formed in the gap between the rotary sleeve 2 and the stationary sleeve 1, that is, in the bearing gap of the radial dynamic pressure bearing, whereby the rotation of the rotary sleeve 2 is supported in a non-contact state with respect to the stationary sleeve 1. Of the four rows of dynamic pressure generating grooves, the two rows of dynamic pressure generating grooves 21a situated at the axial ends pressurize, as the rotary sleeve 2 rotates, the lubricant fluid existing in the bearing gap toward the axial ends, that is, toward the pair of thrust discs 3. The two rows of dynamic pressure generating grooves 21b situated at the axial center pressurizes, as the rotary sleeve 2 rotates, the lubricant fluid existing in the bearing gap toward the axial center, that is, toward the center of the portion between the pair of thrust discs 3.

The thrust discs 3 fixed to the rotation shaft S cooperate with the stationary sleeve 1 so as to form a thrust dynamic pressure bearing, with the stationary sleeve 1 axially extending therebetween. Between the thrust discs 3 and the stationary sleeve 1, predetermined bearing gaps (e.g., 9 $\mu$m) are formed, respectively, with these bearing gaps communicating with the bearing gap of the radial dynamic pressure bearing. In the axial end surfaces of the stationary sleeve opposed to the thrust discs 3, spiral dynamic pressure generating grooves (not shown) are formed, respectively. These spiral dynamic pressure generating grooves are formed as so-called pump-out type grooves which discharge, as the thrust discs 3 rotate, the lubricant fluid in the bearing gaps radially outwards. Thus, when the thrust discs 3 rotate with the rotation shaft S, a high pressure fluid lubricant film is formed in the bearing gap of each thrust dynamic pressure bearing, whereby axial movement of the rotation shaft S with respect to the stationary sleeve 1 is regulated.

In the rotary joint of this embodiment, the lubricant fluid supplied to the bearing gaps of the radial dynamic pressure bearing and the thrust dynamic pressure bearings may be liquid or gas. The lubricant fluid is sucked into the bearing gap of the radial dynamic pressure bearing through suction inlets 11 formed in the stationary sleeve 1. A plurality of suction inlets 11 are formed radially with respect to the stationary sleeve 1, with each suction inlet 11 communicating with annular grooves 12 formed in the outer peripheral surface of the stationary sleeve 1. Further, these suction inlets 11 open on the bearing gap of the radial dynamic pressure bearing in correspondence with the portions between the dynamic pressure generating grooves 21*a* and 21*b* formed in the rotary sleeve 2. Thus, when the rotation shaft S starts to rotate, lubricant fluid is sucked into the bearing gap of the radial dynamic pressure bearing through the annular grooves 12 and the suction inlets 11 to form a high pressure fluid lubricant film. A portion of the lubricant fluid sucked into the bearing gap of the radial dynamic pressure bearing is pressurized toward the thrust discs 3 by the action of the dynamic pressure generating grooves 21*a*, and the remaining portion of the lubricant fluid is pressurized in a direction opposite to the thrust discs 3 by the action of the dynamic pressure generating grooves 21*b*.

Figure 2:
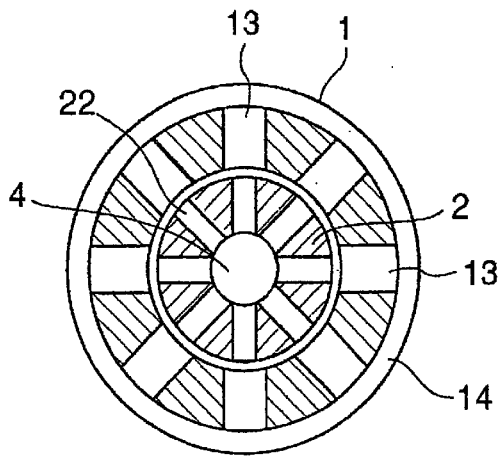
FIG. 2 is a sectional view showing the positional relationship between supply holes formed in a stationary sleeve and recipient holes formed in a rotary sleeve according to the embodiment.

As shown in FIGS. 1 and 2, the rotation shaft S has a passage 4 for axially sending a target fluid that is different from the above-mentioned lubricant fluid. In the rotary sleeve 2 fixed to the rotation shaft S, there are radially formed a plurality of recipient holes 22 communicating with the passage 4. These recipient holes 22 are provided at an axial position corresponding to the longitudinal center of the rotary sleeve 2, that is, at a position where they axially divide the radial dynamic pressure bearing in two. Further, at an axial position corresponding to the longitudinal center of the stationary sleeve 1, there are radially formed a plurality of supply holes 13 opposed to the recipient holes 22 of the rotary sleeve 2, and an annular groove 14 communicating with these supply holes 13 is formed in the outer peripheral surface of the stationary sleeve 1. Thus, when the target fluid is supplied to the annular groove 14, the target fluid is sent to the passage 4 of the rotation shaft S through the supply holes 13 and the recipient holes 22 of the rotary sleeve 2.

And, the rotary joint device of this embodiment, constructed as described above, is used when supplying target fluid from the stationary sleeve 1 side to the passage 4 of the rotation shaft S rotating at high speed. At this time, a gap always exists between the stationary sleeve 1 and the rotary sleeve 2 rotating at high speed, so that if no seal mechanism is provided between the sleeves 1 and 2, there is a fear of a part of the target fluid leaking into the gap when the target fluid enters the recipient holes 22 of the rotary sleeve 2 from the supply holes 13 of the stationary sleeve 1.

However, in the rotary joint device of this embodiment, the supply passage for the target fluid is provided so as to extend through the radial dynamic pressure bearing formed by the stationary sleeve 1 and the rotary sleeve 2, so that when sending the target fluid to the recipient holes 22 of the rotary sleeve 2 from the supply holes 13 of the stationary sleeve 1, it is possible to reduce its leakage to substantially zero. That is, the stationary sleeve 1 and the rotary sleeve 2 constitute a radial dynamic pressure bearing, and only a slight bearing gap exists between the stationary sleeve 1 and the rotary sleeve 2; further, during the rotation of the rotation shaft S, a high pressure fluid lubricant film is formed in this bearing gap. Thus, the target fluid emitted from the supply hole 13 of the stationary sleeve 1 hardly enters the bearing gap of the radial dynamic pressure bearing, and substantially the total amount of it flows into the recipient holes 22 of the rotary sleeve 2 formed at positions where they are opposed to the supply holes 13.

In particular, in this embodiment, a pair of dynamic pressure generating grooves 21*b* are provided on either side of the recipient holes 22 provided in the rotary sleeve, and these dynamic pressure generating grooves 21*b* pressurize the lubricant fluid sucked into the bearing gap of the radial dynamic pressure bearing from the suction inlet 11 toward the recipient holes 22. Thus, the target fluid is hindered by the pressurized lubricant fluid and cannot enter the bearing gap of the radial dynamic pressure bearing, and flows into the recipient holes together with a portion of the lubricant fluid. That is, the lubricant fluid pressurized by the dynamic pressure generating grooves 21*b* functions as a seal for hermetically sealing the target fluid, and the dynamic pressure generating grooves 21*b* pressurizing the lubricant fluid in such a direction constitute a seal mechanism.

Thus, in the rotary joint device of this embodiment, the pressure of the lubricant fluid generated in the bearing gap of the dynamic pressure bearing formed by the rotary sleeve and the stationary sleeve is utilized to prevent leakage of the target fluid, and the target fluid is hermetically sealed by a non-contact type seal involving no mechanical slide contact. Thus, the sealing function is not impaired by long-term use, and the device can sufficiently withstand use for a long period of time. Further, since the target fluid is hermetically sealed by the dynamic pressure bearing rotatably supporting the rotary sleeve with respect to the stationary sleeve, the bearing mechanism and the seal mechanism are realized in an integrated form, making it possible to provide a rotary joint device which is so much the more compact.

Figure 3:
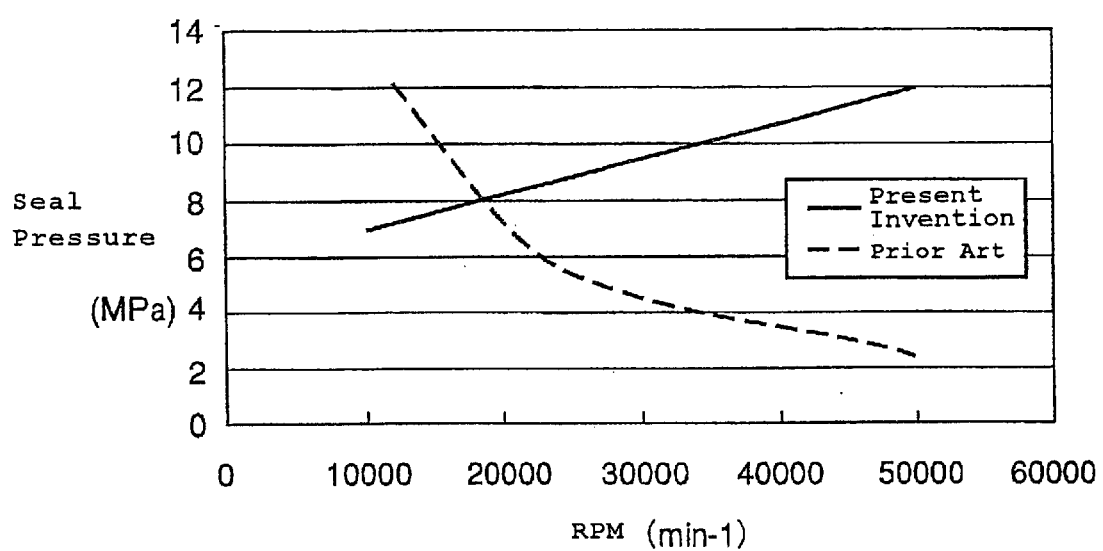
FIG. 3 is a graph showing the relationship between rotary sleeve RPM and seal pressure in a rotary joint device according to the embodiment and in a conventional rotary joint device.

FIG. 3 is a graph showing the results of an examination of the supply allowing pressure for the target fluid with respect the RPM of the rotation shaft in both the rotary joint device of this embodiment and a conventional rotary joint device. The supply allowing pressure is the maximum supply pressure that allows hermetic sealing of the target fluid between the stationary sleeve and the rotary sleeve; if the target fluid is supplied with a pressure beyond this supply allowing pressure, the target fluid will leak from between the stationary sleeve and the rotary sleeve. As is apparent from the solid line in the graph, in the rotary joint device of this embodiment, as the RPM of the rotation shaft increases, the supply allowing pressure for the target fluid, that is, the seal pressure increases, which indicates that the higher the RPM, the more possible it is to supply high pressure target fluid to the passage of the rotation shaft.

On the other hand, as is apparent from the dashed line in the graph, in the conventional rotary joint device, the higher the RPM of the spindle main shaft, the lower the supply allowing pressure for the target fluid. It is to be assumed that this is due to the fact that as the RPM increases, the sliding contact between the stationary portion and the rotary portion of the mechanical seal becomes unstable, causing target fluid to leak so much the more.

This makes it clear that the rotary joint device of this embodiment is suitable for use where high pressure target fluid is supplied to a rotation shaft of high RPM; in such uses, the device is capable of transferring target fluid without involving any loss unlike the conventional device.

Figure 4:
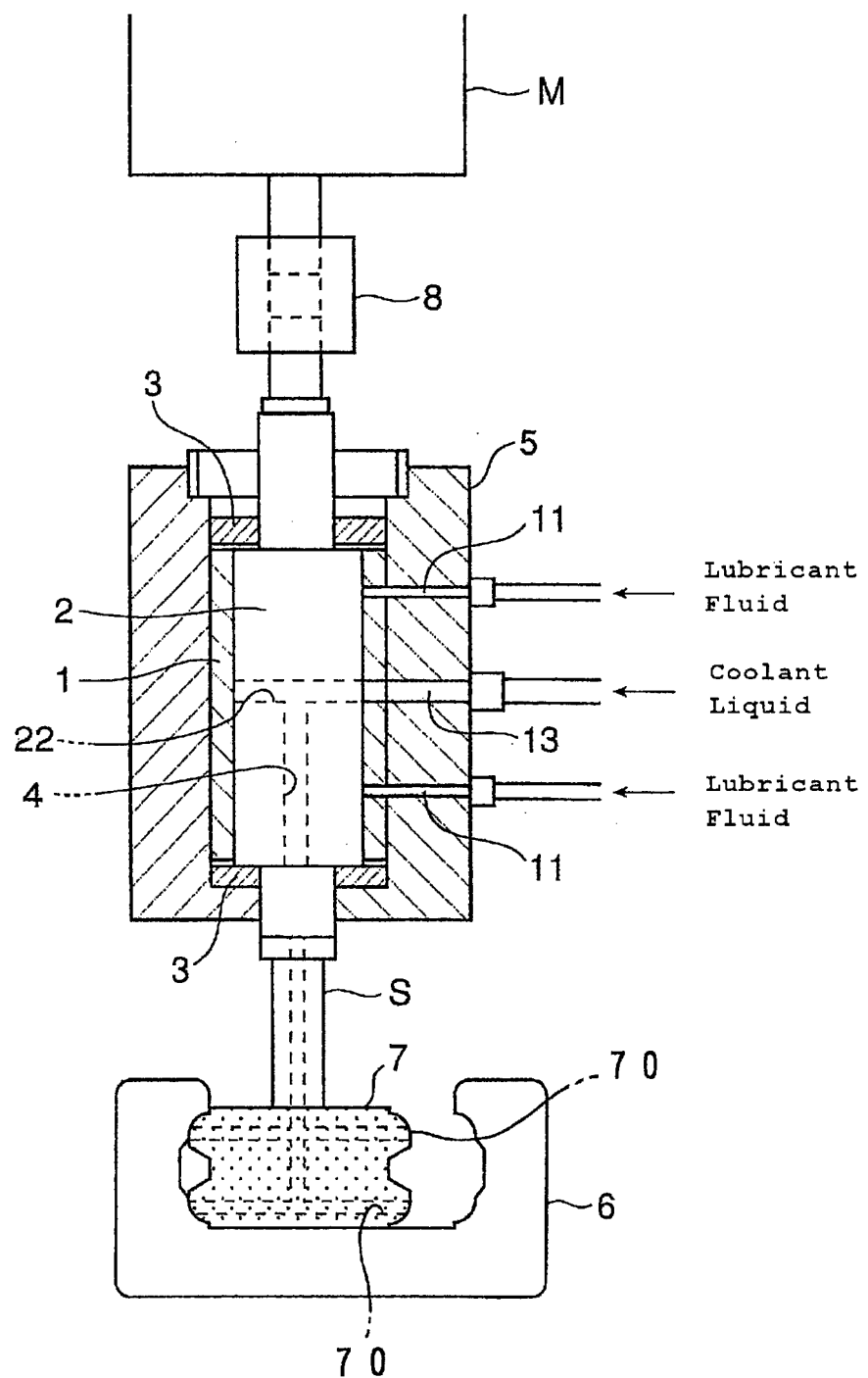
FIG. 4 is a sectional view showing a first application example in which the rotary joint of the present invention is applied to a spindle device.

Next, FIG. 4 shows an example in which the rotary joint of this embodiment is applied to the spindle device of a machine tool. In this application example, the rotary joint is accommodated in a housing 5, and this device also functions as a bearing for rotatably supporting the spindle main shaft S with respect to the housing 5. Attached to the forward end of the spindle main shaft S is a grinding wheel 7 for grinding a workpiece 6, and a motor M is connected to the rear end of the spindle main shaft S through the intermediation of a shaft coupling 8; by rotating the spindle main shaft S by the motor M, the grinding wheel 7 grinds the surface of the workpiece 6. Since the construction of the rotary joint is the same as that of the above-described embodiment, its components are indicated in FIG. 4 by the same reference numerals as used above, and a detailed description thereof will be omitted.

The grinding wheel 7 is equipped with emission holes 70 for emitting coolant liquid, and coolant liquid supplied through the passage 4 extending through the spindle main shaft S is emitted from the emission holes 70, making it possible to supply coolant liquid directly to the machining point where the grinding stone 7 and the workpiece 6 are in contact with each other. The rotary joint is used for the purpose of supplying coolant liquid from the housing side to the passage 4 of the spindle main shaft S rotating at high speed. That is, in this application example, the coolant liquid is the target liquid. In this application example, water is used as the lubricant fluid.

And, in this application example, it is possible to supply coolant liquid from the housing side to the spindle main shaft S rotating at high speed without involving any leakage. Further, it is also possible to support the spindle main shaft S with respect to the housing 5, thus making it possible to form in a very compact structure a spindle device in which coolant liquid is emitted from inside.

Figure 5:
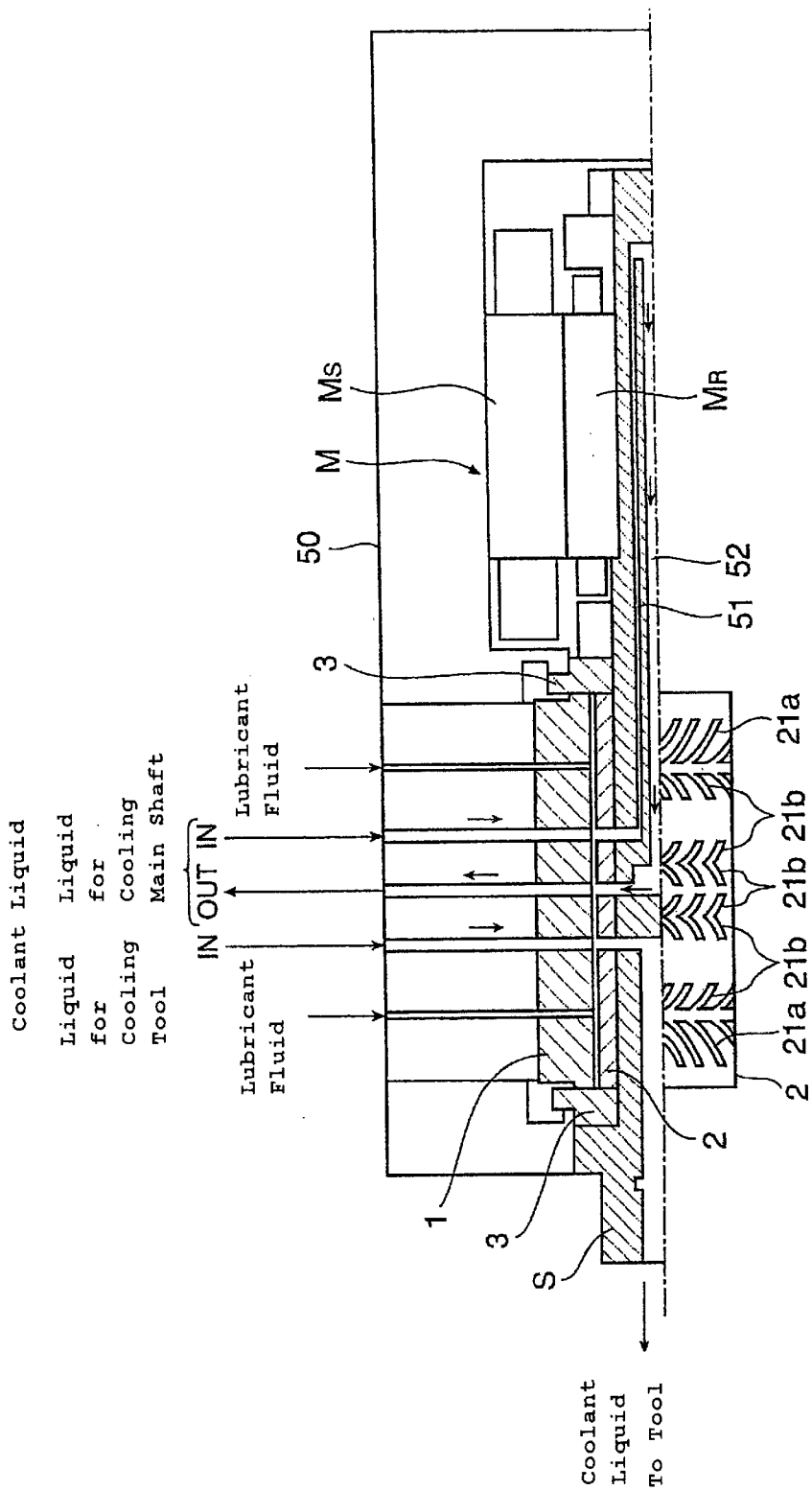
FIG. 5 is a sectional view showing a second application example in which the rotary joint of the present invention is applied to a spindle device.

Next, FIG. 5 also shows an example in which the rotary joint of the above embodiment is applied to the spindle device of a machine tool. In this second application example also, the rotation of the spindle main shaft S with respect to a housing 50 is supported through the intermediation of the rotary joint of the present invention. In this application example, however, the motor M driving the spindle main shaft S is contained in the housing 50, and a motor rotor MR is directly fixed onto the spindle main shaft S. Thus, as compared with the first application example, the handling, mounting, etc. are facilitated. On the other hand, the heat generated in the motor M is likely to flow into the spindle main shaft S; when the spindle main shaft is rotated at high speed, the spindle main shaft S is likely to undergo thermal expansion, resulting in a deterioration in work machining precision.

Figure 6:
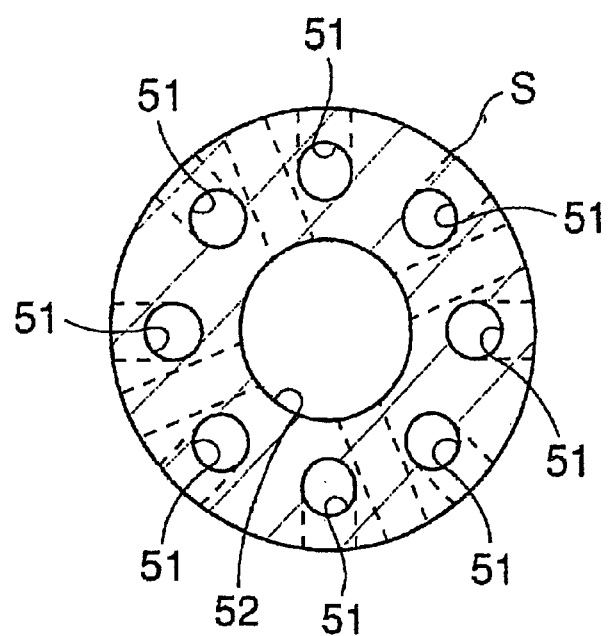
FIG. 6 is a sectional view taken along a direction perpendicular to the axial direction of the spindle main shaft in the second application example.

In view of this, in the second application example, coolant liquid is introduced into the spindle main shaft S from the housing 50 through the rotary joint, and after being circulated in the spindle main shaft S, the coolant liquid is returned again to the housing 50 side through the rotary joint. Specifically, forward cooling passages 51 and a backward cooling passage 52 for the coolant liquid are formed to extend from the attachment position of the rotary joint (rotary sleeve 2) on the spindle main shaft S to the fixing position of the motor rotor MR, and delivery of coolant liquid is effected between the forward and backward passages 51 and 52 through the rotary joint. FIG. 6 is a sectional view showing the forward and backward passages 51 and 52 formed in the spindle main shaft S. The coolant liquid introduced into the forward cooling passages 52 of the spindle main shaft S through the stationary sleeve 1 and the rotary sleeve 2 moves inside the spindle main shaft S to the fixing position of the motor rotor MR, and takes away the heat transferred to the spindle main shaft S from the motor rotor MR. The coolant liquid that has taken away the heat passes through the backward cooling passage 52 provided at the center of the spindle main shaft S, and is discharged to the housing 50 side through the rotary joint. The forward cooling passages 51 are formed so as to surround the backward cooling passage 52, making it so much the easier to take away the heat flowing into the spindle main shaft S from the motor rotor MR.

Further, in this example, it is necessary to perform delivery of coolant liquid for cooling the tool and for cooling the spindle main shaft between the stationary sleeve 1 and the rotary sleeve 2, so that, on the surface of the rotary sleeve 2, there are formed dynamic pressure generating grooves 21a and 21b of an optimum configuration with the recipient holes being therebetween. Of those grooves, the dynamic pressure generating grooves 21a formed at the axial ends of the rotary sleeve 2 are provided mainly for the purpose of securing the dynamic pressure bearing function, and the other dynamic pressure generating grooves 21b are provided mainly for the purpose of preventing high pressure coolant liquid from diffusing into the bearing gap (for sealing).

And, in this second application example also, it is possible to send high pressure coolant liquid from the housing into the spindle main shaft rotating at high speed, and the coolant liquid can be utilized in the cooling of the tool and the spindle main shaft itself. Further, since the rotary joint device itself effecting delivery of coolant liquid between the housing and the spindle main shaft also serves as the bearing of the spindle main shaft, it is possible to form a spindle device of a very compact structure.

What is claimed is:

1. A rotary joint device which connects to each other piping formed in a stationary side member and piping formed in a rotary side member and which performs delivery of a target fluid between the stationary side member and the rotary side member, wherein the stationary side member and rotary side member are opposed to each other through the intermediation of a predetermined gap, into which a lubricant liguid is introduced to form a dynamic pressure bearing, wherein the stationary side member has a supply hole opening on the bearing gap of the dynamic pressure bearing and adapted to supply the target fluid to the rotary side member, wherein the rotary side member has a recipient hole opening on the bearing gap of the dynamic pressure bearing so as to be opposed to the supply hole and adapted to receive the target fluid from the supply hole, wherein the stationary side member or the rotary side member has a pair of dynamic pressure generating grooves which face the bearing gap between these members, with the recipient hole or the supply hole being therebetween, and wherein the dynamic pressure generating grooves are formed in such a pattern as to pressurize the lubricant fluid in the bearing gap toward the recipient hole and the supply hole.

2. A rotary joint device which connects to each other piping formed in a stationary side member and piping formed in a rotary side member and which performs delivery of a target fluid between the stationary side member and the rotary side member, wherein the stationary side member and rotary side member are opposed to each other through the intermediation of a predetermined gap, into which a lubricant liguid is introduced to form a dynamic pressure bearing, wherein the stationary side member has a supply hole opening on the bearing gap of the dynamic pressure bearing and adapted to supply the target fluid to the rotary side member, and wherein the rotary side member has a recipient hole opening on the bearing gap of the dynamic pressure bearing so as to be opposed to the supply hole and adapted to receive the target fluid from the supply hole, and wherein the dynamic pressure bearing is a radial dynamic pressure bearing in which the inner peripheral surface of the stationary side member and the outer peripheral surface of the rotary side member are opposed to each other through the intermediation of a predetermined bearing gap.

3. A rotary joint device which connects to each other piping formed in a stationary side member and piping formed in a rotary side member and which performs delivery of a target fluid between the stationary side member and the rotary side member, wherein the stationary side member and rotary side member are opposed to each other through the intermediation of a predetermined gap, into which a lubricant liquid is introduced to form a dynamic pressure bearing, wherein the stationary side member has a supply hole opening on the bearing gap of the dynamic pressure bearing and adapted to supply the target fluid to the rotary side member, wherein the rotary side member has a recipient hole opening on the bearing gap of the dynamic pressure bearing so as to be opposed to the supply hole and adapted to receive the target fluid from the supply hole, wherein the stationary side member or the rotary side member has a pair of dynamic pressure generating grooves which face the bearing gap between these members, with the recipient hole or the supply hole being therebetween, wherein the dynamic pressure generating grooves are formed in such a pattern as to pressurize the lubricant fluid in the bearing gap toward the recipient hole and the supply hole and wherein the dynamic pressure bearing is a radial dynamic pressure bearing in which the inner peripheral surface of the stationary side member and the outer peripheral surface of the rotary side member are opposed to each other through the intermediation of a predetermined bearing gap.

* * * * *